United States Patent [19]

Wissinger

[11] Patent Number: 5,299,869
[45] Date of Patent: Apr. 5, 1994

[54] LASER DIODE TEMPERATURE SENSING SYSTEM

[75] Inventor: Alan B. Wissinger, Wilton, Conn.

[73] Assignee: Hughes Aircraft Company, Los Angeles, Calif.

[21] Appl. No.: 932,103

[22] Filed: Aug. 19, 1992

[51] Int. Cl.$^5$ .................... G01K 3/00; G01K 11/00
[52] U.S. Cl. .................... 374/137; 374/161; 374/141; 250/227.23
[58] Field of Search ........... 374/166, 161, 137, 178, 374/141; 250/227.23

[56] References Cited

U.S. PATENT DOCUMENTS

| | | | |
|---|---|---|---|
| 3,688,295 | 8/1972 | Tsoras et al. | 374/166 |
| 4,324,138 | 4/1982 | Davis et al. | 374/137 |
| 4,699,519 | 10/1987 | Persson | 374/166 |
| 4,700,064 | 10/1987 | Fujita | 250/227.23 |
| 4,814,604 | 3/1989 | Liquime | 374/161 |
| 4,828,401 | 5/1989 | Sawyer | 374/137 |
| 4,916,643 | 4/1990 | Ziegler et al. | 374/166 |

FOREIGN PATENT DOCUMENTS

| | | | |
|---|---|---|---|
| 0023345 | 2/1981 | European Pat. Off. | 374/161 |
| 0242684 | 2/1987 | Fed. Rep. of Germany | 374/161 |

Primary Examiner—Diego F. F. Gutierrez
Attorney, Agent, or Firm—Michael W. Sales; Wanda K. Denson-Low

[57] ABSTRACT

A system for sensing temperature at a plurality of locations, wherein a laser diode device (12) is used as a temperature sensing element at each of the plurality of locations, includes a corresponding plurality of modulators (30) for uniquely modulating each laser diode device (12) at a unique frequency or at a unique temporal code. The uniquely modulated laser diode devices (12) produce uniquely modulated single-mode wavelength outputs of radiation which are collected by a spectrometer (18). However, the single-mode wavelength output of each laser diode device (12) is sensitive to temperature and therefore varies over temperature. Thus, the spectrometer (18) groups the single-mode wavelength outputs of the laser diode devices (12) according to wavelength, or temperature, and converts the grouped wavelengths into multi-modulated electrical signals (20). A demodulator (22) filters these signals (20) according to the unique modulations of the modulator (30) and thereby provides a group of output signals (24) indicating the temperature at each laser diode device (12) location.

26 Claims, 4 Drawing Sheets

LASER DIODE TEMPERATURE SENSING SYSTEM

BACKGROUND OF THE INVENTION

1. Field of the Invention

The present invention relates to methods for sensing temperature and, more particularly, to a method for sensing temperature wherein a laser diode is used as a sensing element.

2. Description of the Prior Art

The sensing of temperature is a function that is required in a variety of arts. For example, the temperature of a material may need to be sensed so as to control its thermal distortion, or the temperature of an environment may need to be sensed so as to ensure an efficient operation of a resident system.

It is often required that temperature be sensed at a number of locations within an environment that contains a particular resident system. Such is true in an environment where there are large thermal gradients or where small variations in temperature can result in large system effects. For example, a typical space based optics system operates in an environment where there can be large thermal gradients depending upon the position of this system with respect to incident solar radiation, and where small variations in the temperature can result in large distortions of optical images.

Environments, or systems, that require temperature to be sensed at a number of locations generally use thermistors or thermocouples to accomplish the task. Although these types of temperature sensors are relatively simple and inexpensive, both require at least two electrical wires to be run from each temperature sensor to a temperature recording device. Thus, in a system such as a typical space optics system where as many as a hundred points are monitored for temperature, large and heavy cables comprised of several hundred electrical wires must be run between the sensed locations and the temperature recording device. Furthermore, due to a large amount of electromagnetic interference (EMI) in a typical space environment, the signals generated by the temperature sensors must be passed through expensive EMI filters. These large and heavy cables and expensive EMI filters are a burden when trying to design a low weight and low cost system.

Also, in many situations a rotating system requires temperature sensing. In these types of systems a thermistor is usually used in conjunction with a slip ring so as to maintain a continuous electrical connection between the temperature sensor and the temperature recording device. However, slip rings have only a limited life and they add considerable weight to a system. Thus, the use of a thermistor with a slip ring in a rotating system is another shortcoming that is associated with electrical temperature sensors. It is therefore desirable to overcome the above-mentioned shortcomings while providing an accurate and reliable temperature sensing scheme.

SUMMARY OF THE INVENTION

The present invention contemplates an accurate and reliable method for sensing temperature at a number of locations without the need for large and heavy electrical cables. Such a method is performed by using a laser diode device as a temperature sensing element at each location. Specifically, each laser diode device is exploited by way of its sensitivity to changes in temperature, whereby the single-mode wavelength of a typical laser diode device is shifted by 1–3 Å per every 1° C. change in temperature. This sensitivity is detected by a remote spectrometer which contains a spectral disperser that separates the single-mode wavelengths of each of the laser diode devices according to temperature and a photoelectric detector that converts the separated wavelengths into electrical signals. These electrical signals are then passed through an array of bandpass filters whereby they are distinguished according to laser diode device location.

The location of each laser diode device is distinguished from another by temporally modulating each laser diode device at a unique frequency. This temporal modulation can be performed either by supplying each laser diode device with its own battery-powered oscillator or by supplying each laser diode device with an oscillator that is powered by a common power supply. Either way, the electrical signals generated by the photoelectric detector are distinguishable by way of temporal modulation, and when passed through the bandpass filter array they are demodulated to produce a group of electrical signals that are indicative of the temperature at each laser diode device location.

The sensitivity to temperature change of each laser diode device is detected through the use of either a direct optical fiber connection or a wide angle optical receiving scheme. When using a direct optical fiber connection only a single fiber need be run between the temperature sensing region and the remote spectrometer. This single fiber can be routed serially between each laser diode device or a fiber from each laser diode device can be parallel coupled into the single fiber. The purpose of this single optical fiber is to carry the light emitted from each laser diode device to the spectrometer for processing.

When using a wide angle optical receiving scheme, there is no direct connection made between the laser diode devices and the spectrometer. This scheme maintains a wide angle lens at the entrance to the spectrometer which collects discrete laser diode device images that are then scrambled and directed toward the spectral disperser. Thus, this scheme only requires that each laser diode device emit a light beam which has sufficient intensity so as to be collected by the wide angle lens and then be processed by the spectrometer and the demodulator bandpass filters.

The use of either a direct optical fiber connection or a wide angle optical receiving scheme essentially eliminates the prior art burden of bulky electrical cables and their associated weight and costs. It is thus apparent how the present invention can overcome the above-mentioned shortcomings of existing temperature sensing methods.

The primary objective of the present invention is therefore to provide a means for sensing temperature at a number of locations without having the burden of large and heavy electrical cables and their associated weight and costs.

DETAILED DESCRIPTION OF THE PRESENT INVENTION

Figure 1:
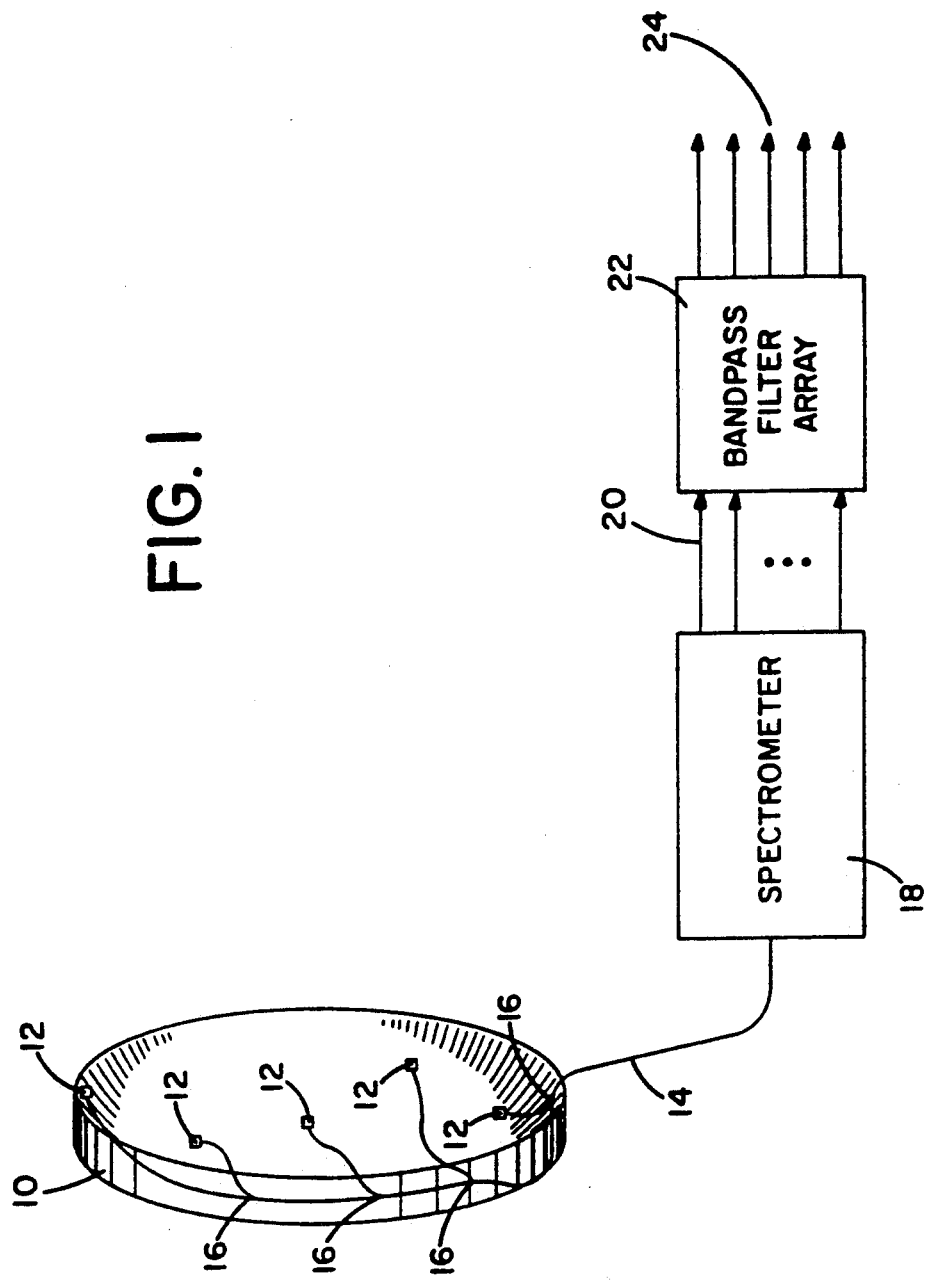
FIG. 1 is a perspective view of a large optical mirror with an opaque substrate that is being sensed for temperature at a number of locations via a direct optical fiber connection according to the present invention.

Referring to FIG. 1, there is shown a first embodiment of the present invention whereby a large optical mirror 10 has a substrate that is fabricated from an opaque material which does not permit the transmission of visible light therethrough. Embedded within the mirror 10 are a number of laser diode devices 12, each designed to operate at the same single-mode wavelength. These laser diode devices 12 are distinct, however, in that the supply current (not shown) to each of the devices 12 is temporally modulated at a unique frequency or according to a unique temporal code. This unique modulation of supply current results in a unique modulation in the visible light output from each of the laser diode devices 12.

Each of the laser diode devices 12 is connected to a single optical fiber 14 via a serial or a parallel coupling 16. This coupling 16 ensures that the uniquely modulated visible light outputs from each of the laser diode devices 12 are carried over the single optical fiber 14. Thus, the location of each laser diode device 12 within the mirror 10 can be determined from each uniquely modulated visible light output as it is carried over the single optical fiber 14. It should be noted that the coupling 16 to the single optical fiber 14 can be accomplished by using any of a number of commercially available fiber couplers.

The single optical fiber 14 is routed from the mirror 10 to a remote spectrometer 18. This remote spectrometer 18 receives a composite visible light beam from the single optical fiber 14 that is made up of all the uniquely modulated visible light outputs from all of the laser diode devices 12. The spectrometer 18 separates this received composite visible light beam according to wavelength, which, consequently, also corresponds to a separation according to temperature. This corresponding temperature separation occurs due to a single-mode wavelength sensitivity characteristic of the laser diode devices 12 over temperature. Such a sensitivity characteristic is exhibited by a 1-3 Å change in the single-mode wavelength of a typical laser diode device per every 1° C. change in temperature. Thus, the single-mode wavelength of each laser diode device 12 varies over temperature, and the remote spectrometer 18 groups the visible light outputs from each of the laser diode devices 12 according to wavelength, or temperature.

Once the composite visible light beam is separated, or the uniquely modulated visible light outputs from each of the laser diode devices 12 are grouped according to wavelength, the spectrometer 18 converts these separated, or grouped, optical signals into electrical signals 20. Each of these electrical signals 20 represents a specific temperature and, depending upon the sensed temperature of each laser diode device 12, each electrical signal 20 may contain one or more or none of the unique frequencies or unique temporal codes that were applied to the supply currents of each of the laser diode devices 12.

To determine the location of each laser diode device 12, these electrical signals 20 are passed through an array 22 of bandpass filters. The filters in the array 22 are bandwidth centered about the temporal modulation frequencies or codes of the laser diode supply currents. Thus, the bandpass filter array 22 sorts out the unique location-coded temporal modulations and the array 22 outputs a group of electrical signals 24 that indicate the temperature at each laser diode device 12 location.

Figure 2:
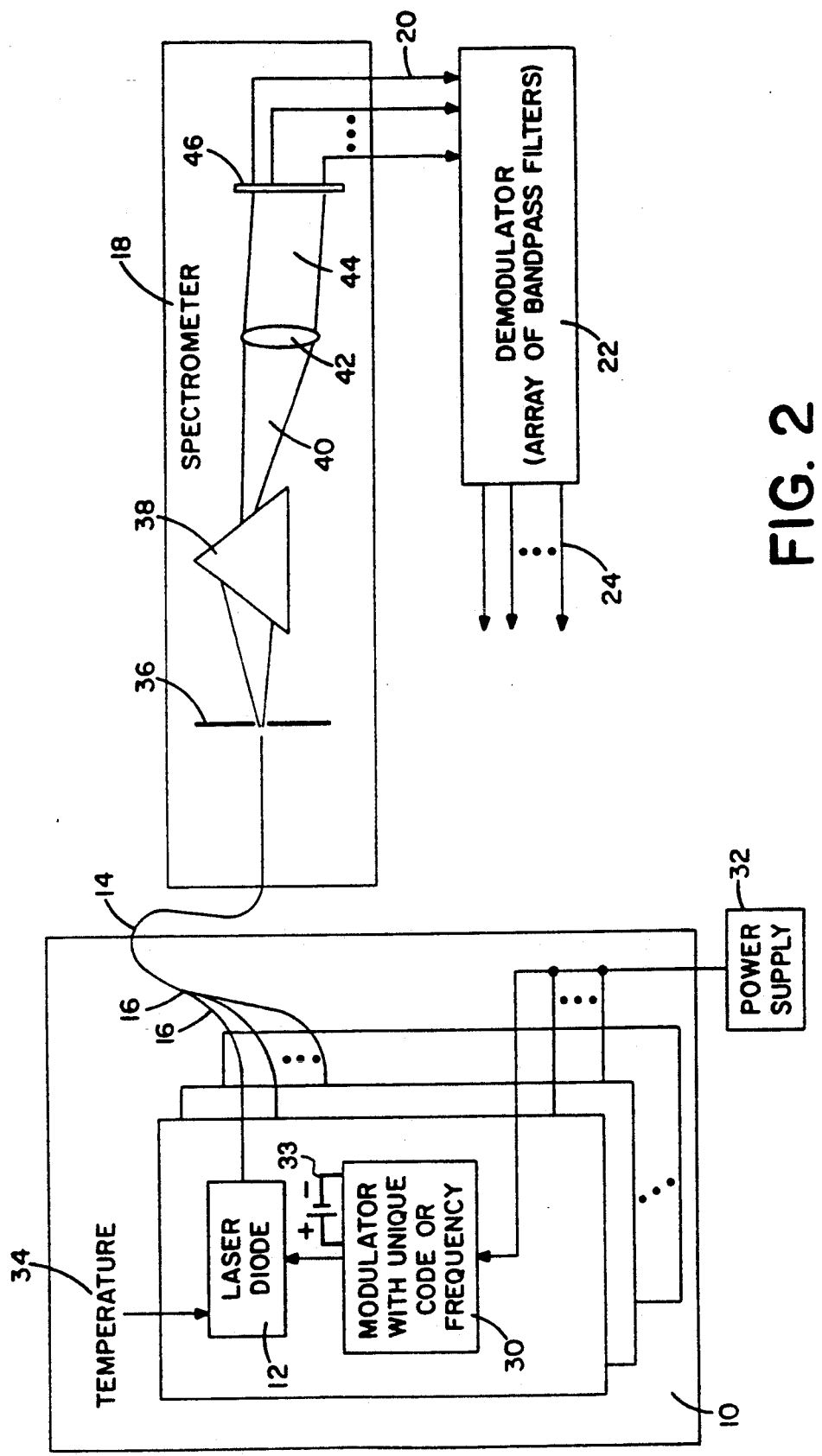
FIG. 2 is a schematic representation of the present invention laser diode temperature sensing system using a direct optical fiber connection.

Referring to FIG. 2, there is shown a more detailed representation of the first embodiment of the present invention than is shown in FIG. 1. A forward current is biased in each laser diode device 12 by a modulator 30 which is powered by a common power supply 32. Each modulator 30 comprises a stable oscillator which operates at a unique frequency or a unique temporal code, thereby resulting in a unique modulation in the visible light output from each of the laser diode devices 12. It should be noted, however, that in some applications the modulators 30 may be powered by batteries 33, thereby eliminating the external power supply 32 connection. In either case, the power required for each laser diode device 12 will only be in the low milliwatt range, thus self-heating is minimal.

The laser diode devices 12 are embedded in the mirror 10 at a number of locations. At these locations, each laser diode device 12 is subject to a particular radiated temperature 34. It should be noted that, depending upon the object or environment to be temperature sensed, the heat sinking between the laser diode device 12 and the surrounding matter is a critical parameter in obtaining high accuracy temperature measurements. Accordingly, in the present case, the laser diodes 12 are in intimate thermal contact with the large optical mirror 10.

All the laser diode devices 12 are coupled 16 to the single optical fiber 14, and the fiber 14 is routed to the remote spectrometer 18. The composite visible light beam carried by the single optical fiber 14 is spatially filtered through an apertured plate 36 and is projected toward a spectral disperser 38. The spectral disperser 38 separates the composite beam according to wavelength and a resulting dispersed beam 40 is collimated through a collimating lens 42. A resulting collimated dispersed beam 44 is then projected onto a linear photoelectric detector 46, such as a charge coupled device (CCD) or a wavelength division optical demultiplexer, which performs an optical-to-electrical conversion.

The linear photoelectric detector 46 has a predetermined mapping, whereby each particular point on the detector 46 corresponds to a particular temperature. This predetermined mapping results in the detector 46 performing a temperature related optical-to-electrical conversion on the collimated dispersed beam 44, whereby the separated wavelengths in the beam 44 are converted into the electrical signals 20 that represent specific temperatures. As previously described, each of these electrical signals 20 may contain one or several or none of the unique frequencies or unique temporal codes that were applied to the supply currents of each of the laser diode devices 12. Furthermore, the location of each of the laser diode devices 12 is determined by demodulating these electrical signals 20 through an array 22 of bandpass filters, thereby producing a group of electrical signals 24 that indicate the temperature at each of the laser diode device 12 locations.

Figure 3:
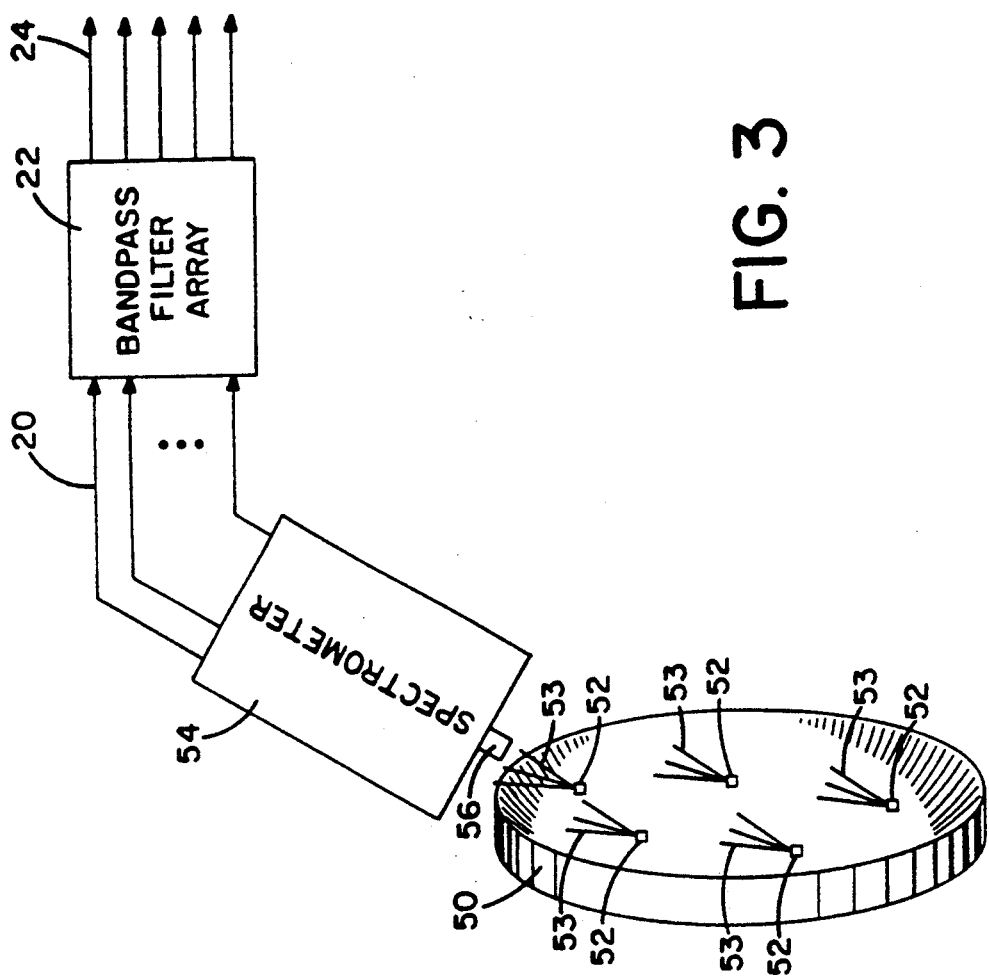
FIG. 3 is a perspective view of a large optical mirror with a transparent substrate that is being sensed for temperature at a number of locations via a wide angle lens according to the present invention.

Referring FIG. 3, there is shown a second embodiment of the present invention whereby a large optical mirror 50 has a substrate that is fabricated from an optically transparent or translucent material which permits the transmission of visible light therethrough. Embedded within the mirror 50 are a number of laser diode devices 52, each designed to operate at the same single-mode wavelength. Similar to the first embodiment, these laser diode devices 52 are distinct in that the supply current (not shown) to each of the devices 52 is temporally modulated at a unique frequency or according to a unique temporal code. Thus, the visible light output 53 from each of these laser diode devices 12 is uniquely modulated.

Since the substrate material of the mirror 50 permits visible light transmission, the visible light outputs 53 from each of the laser diode devices 12 are detectable from outside the mirror 50 substrate. Thus, no optical fiber need be routed to each of the laser diode devices 52 to insure that the uniquely modulated visible light outputs 53 from the laser diode devices 52 are processed by a remote spectrometer 54. Instead, all the uniquely modulated visible light outputs 53 are collected by a wide angle lens 56 that is mounted to the spectrometer 54 at its entrance. The light collected by this wide angle lens 56 is scrambled inside the spectrometer 54 to form a composite visible light beam which is then processed in a manner similar to that of the first embodiment. Since the processing of the composite light beam is common between the first and second embodiments, the remaining components of the second embodiment shown in FIG. 3 are identical to the corresponding remaining components of the first embodiment shown in FIG. 1, and are therefore numerically identified as such.

It should be noted that the wide angle lens 56, and hence the attached spectrometer 54, should be positioned so as to allow a portion of each uniquely modulated visible light output 53 to be collected. It should also be noted that the function of the spectrometer 54 is to perform an optical-to-electrical conversion on the composite visible light beam based on wavelength. Thus, the intensity of the collected uniquely modulated visible light outputs 53 need only be sufficient enough to allow processing by the spectrometer 54 and the bandpass filter array 22.

Figure 4:
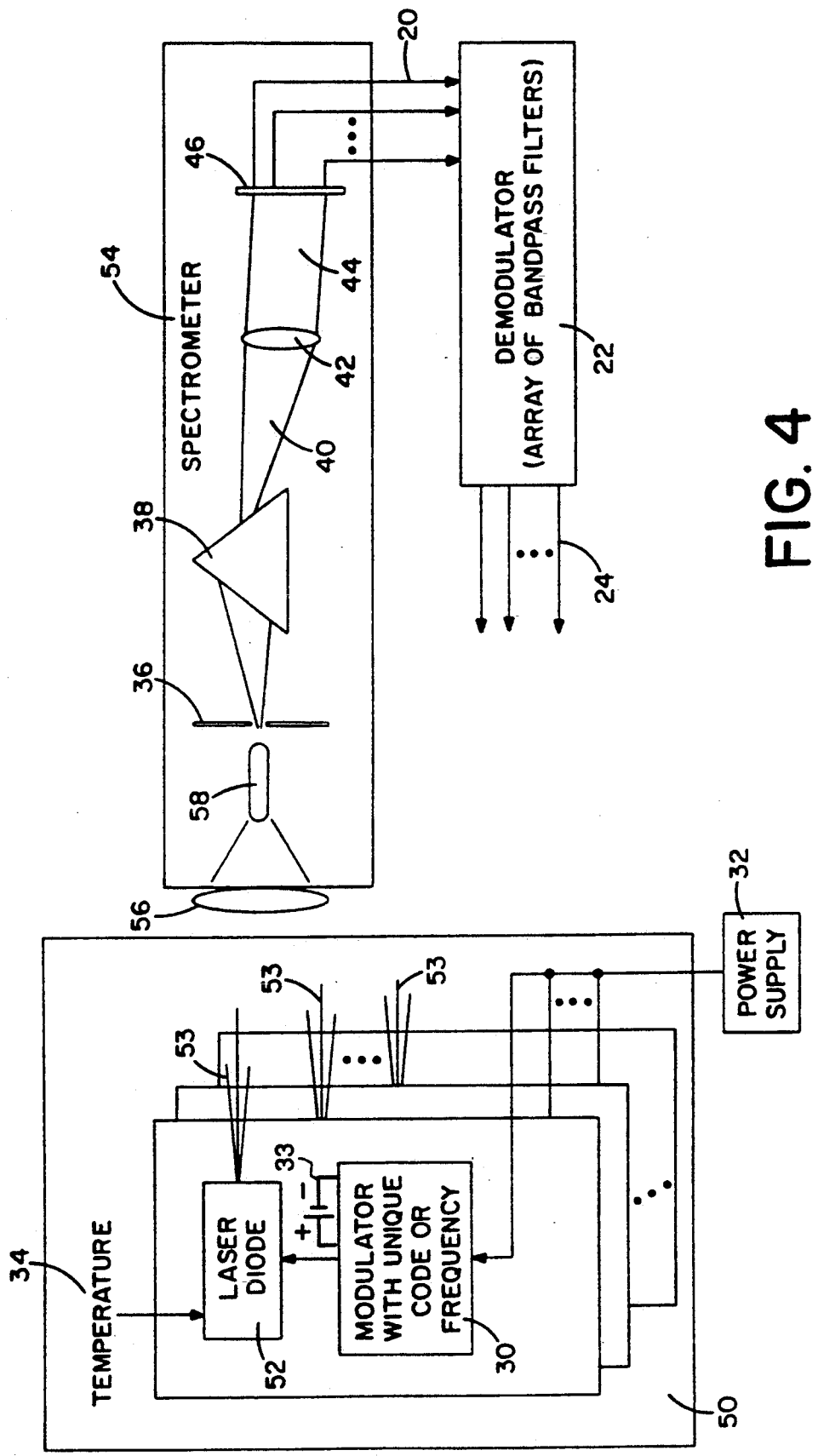
FIG. 4 is a schematic representation of the present invention laser diode temperature sensing system using a wide angle lens.

Referring to FIG. 4, there is shown a more detailed representation of the second embodiment of the present invention than is shown in FIG. 3. Similar to the first embodiment, a forward current is biased in each laser diode device 12 by a modulator 30 which comprises a crystal oscillator operating at a unique frequency that is powered by a common power supply 32, or battery 33. However, since the substrate material of the mirror 50 permits visible light transmission, no optical fiber need be routed to each of the laser diode devices 52. Instead, the uniquely modulated visible light outputs 53 from the laser diode devices 52 are collected by the wide angle lens 56 and scrambled to form a composite visible light beam. The scrambling of the collected visible light outputs 53 is performed by an optical fiber bundle 58, or an equivalent visible light scrambling device. After scrambling the collected uniquely modulated visible light outputs 63, the resulting composite visible light beam is processed in the same manner as in the first embodiment. Thus, the remaining components of the second embodiment shown in FIG. 4 are identical to the corresponding remaining components of the first embodiment shown in FIG. 2, and are therefore numerically identified as such.

The use of either of the above described embodiments is capable of detecting temperature changes of 0.05° C. with a modest spectral resolution of 2000. If greater accuracy is required, however, an order of magnitude increase in precision is possible by using more complex spectrometers.

It is thus seen that the objective set forth above is efficiently attained and, since certain changes may be made in the above-described system without departing from the scope of the invention, it is intended that all matter contained in the above description or shown in the accompanying drawings shall be interrupted as illustrative and not in a limiting sense.

What is claimed is:

1. A laser diode temperature sensing system comprising:

a plurality of laser diode devices disposable at a like plurality of locations where temperature is desired to be sensed, each said laser diode device having a sensitivity characteristic wherein a single-mode wavelength output of each said laser diode device varies over temperature;

means for modulating each said laser diode device at a unique frequency or at a unique temporal code, said modulation resulting in each said laser diode device producing a uniquely modulated single-mode wavelength output;

means for collecting each said uniquely modulated single-mode wavelength output and for forming a composite beam of multi-modulated radiation from all of said collected uniquely modulated single-mode wavelength outputs; and means for processing said formed composite beam of multi-modulated radiation by separating said composite beam of multi-modulated radiation according to wavelength, converting said wavelength separated multi-modulated radiation into multi-modulated electrical signals, and demodulating said multi-modulated electrical signals, so as to provide a plurality of electrical signals that correspondingly indicate the temperature at each of said plurality of temperature sensed locations.

2. The system as defined in claim 1, wherein said means for modulating comprises:

means for biasing a forward current to each said laser diode device; and means for supplying power to said biasing means.

3. The system as defined in claim 2, wherein said means for biasing comprises a stable oscillator operating at a unique frequency.

4. The system as defined in claim 2, wherein said means for supplying power is a remote common power supply.

5. The system as defined in claim 2, wherein said means for supplying power is a local individual battery.

6. The system as defined in claim 1, wherein said means for collecting comprises an optical fiber, and wherein each said laser diode device is coupled to said optical fiber, such that each said uniquely modulated single-mode wavelength output produced by each said laser diode device is carried over said optical fiber thereby forming said composite beam of multi-modulated radiation.

7. The system as defined in claim 1, wherein said means for collecting comprises a wide angle lens, wherein said wide angle lens collects each said uniquely modulated single-mode wavelength output produced by each said laser diode device, and wherein said wide angle lens directs each said collected uniquely modulated single-mode wavelength output towards said processing means.

8. The system as defined in claim 7, wherein said means for collecting further comprises a means for scrambling each said uniquely modulated single-mode wavelength output collected by said wide angle lens, such that said composite beam of multi-modulated radiation is thereby formed.

9. The system as defined in claim 8, wherein said means for scrambling comprises an optical fiber bundle.

10. The system as defined in claim 1, wherein said means for processing comprises:
    means for optically dispersing said composite beam of multi-modulated radiation, such that said composite beam of multi-modulated radiation is separated according to wavelength;
    means for converting said wavelength separated multi-modulated radiation into said multi-modulated electrical signals; and
    means for demodulating said multi-modulated electrical signals so as to provide said plurality of electrical signals that correspondingly indicate the temperature at each of said plurality of temperature sensed locations.

11. The system as defined in claim 10, wherein said means for converting comprises a photoelectric detector.

12. The system as defined in claim 10, wherein said means for demodulating comprises an array of bandpass filters, wherein said array of bandpass filters are designed such that each bandpass filter has a passband that is centered at one of said unique modulation frequencies or unique temporal codes.

13. A laser diode temperature sensing system comprising:
    a laser diode device disposable at each of N locations where temperature is desired to be sensed, each said laser diode device having a sensitivity characteristic wherein a single-mode wavelength output of each said laser diode device varies over temperature, said N locations corresponding to an integer number of locations where N is greater than zero;
    means for providing an excitation to each said laser diode device, wherein said excitation means results in each said laser diode device producing a uniquely modulated single-mode wavelength output;
    means for collecting each said uniquely modulated single-mode wavelength output produced by each said laser diode device; and
    means for processing each said collected uniquely modulated single-mode wavelength output by grouping all of said uniquely modulated single-mode wavelength outputs according to wavelength, converting each said group of uniquely modulated single-mode wavelength outputs into a multi-modulated electrical signal, and demodulating each said multi-modulated electrical signal, so as to provide N electrical signals that correspondingly indicate the temperature at each of said N temperature sensed locations.

14. The system as defined in claim 13, wherein said means for providing an excitation comprises:
    means for biasing a forward current to each said laser diode device at a unique frequency or at a unique temporal code; and
    means for supplying power to said biasing means.

15. The system as defined in claim 14, wherein said means for biasing comprises a crystal oscillator operating at a unique frequency.

16. The system as defined in claim 14, wherein said means for supplying power is a remote common power supply.

17. The system as defined in claim 14, wherein said means for supplying power is a local individual battery.

18. The system as defined in claim 13, wherein said means for collecting comprises an optical fiber, and wherein each said laser diode device is coupled to said optical fiber, such that each said uniquely modulated single-mode wavelength output produced by each said laser diode device is carried over said optical fiber for subsequent processing by said processing means.

19. The system as defined in claim 13, wherein said means for collecting comprises a wide angle lens, wherein side wide angle lens collects each said uniquely modulated single-mode wavelength output produced by each said laser diode device, and wherein said wide angle lens directs each said collected uniquely modulated single-mode wavelength output towards said processing means.

20. The system as defined in claim 19, wherein said means for collecting further comprises a means for scrambling each said uniquely modulated single-mode wavelength output collected by said wide angle lens.

21. The system as defined in claim 20, wherein said means for scrambling comprises an optical fiber bundle.

22. The system as defined in claim 13, wherein said means for processing comprises:
    means for grouping all of said uniquely modulated single-mode wavelength outputs according to wavelength;
    means for converting each said group of uniquely modulated single-mode wavelength outputs into a multi-modulated electrical signal; and
    means for demodulating each said multi-modulated electrical signal so as to provide said N electrical signals that correspondingly indicate the temperature at each of said N temperature sensed locations.

23. The system as defined in claim 22, wherein said means for converting comprises a photoelectric detector.

24. The system as defined in claim 22, wherein said means for demodulating comprises an array of bandpass filters, wherein said array of bandpass filters are designed such that each bandpass filter has a passband that is centered at a demodulation rate corresponding to at least one of said uniquely modulated excitations.

25. A method for sensing temperature, wherein a laser diode device is employed as a temperature sensing element, said method comprising the steps of:
    disposing a laser diode device at each of a plurality of locations where temperature is desired to be sensed, each said laser diode device having a sensitivity characteristic wherein a single-mode wavelength output of each said laser diode device varies over temperature;
    modulating each said laser diode device at a unique frequency or at a unique temporal code, said modulation resulting in each said laser diode device producing a uniquely modulated single-mode wavelength output;

collecting each said uniquely modulated single-mode wavelength output and forming a composite beam of multi-modulated radiation from all of said collected uniquely modulated single-mode wavelength outputs; and processing said composite beam of multi-modulated radiation, so as to provide a plurality of electrical signals that correspondingly indicate the temperature at each of said plurality of temperature sensed locations.

26. The method as defined in claim 25, wherein said step of processing includes the substeps of:

separating said composite beam of multi-modulated radiation according to wavelength;

converting said wavelength separated multi-modulated radiation into multi-modulated electrical signals; and demodulating said multi-modulated electrical signals so as to provide said plurality of electrical signals that correspondingly indicate the temperature at each of said plurality of temperature sensed locations.

* * * * *